(12) United States Patent
Bonarirgo

(10) Patent No.: US 8,752,972 B2
(45) Date of Patent: Jun. 17, 2014

(54) LIGHTING SYSTEM

(75) Inventor: Michael Bonarirgo, Elmhurst, IL (US)

(73) Assignee: Patno Enterprise, LLC, Elmhurst, IL (US)

( * ) Notice: Subject to any disclaimer, the term of this patent is extended or adjusted under 35 U.S.C. 154(b) by 192 days.

(21) Appl. No.: 13/269,413

(22) Filed: Oct. 7, 2011

(65) Prior Publication Data

US 2013/0088846 A1    Apr. 11, 2013

(51) Int. Cl.
*F21V 33/00* (2006.01)

(52) U.S. Cl.
USPC .......................................... 362/95

(58) Field of Classification Search
USPC .......................................... 362/95
See application file for complete search history.

(56) References Cited

U.S. PATENT DOCUMENTS

| | | | |
|---|---|---|---|
| 3,976,986 A | 8/1976 | Zabroski | |
| 4,152,624 A | 5/1979 | Knaebel | |
| 4,199,754 A | 4/1980 | Johnson et al. | |
| 4,597,033 A | 6/1986 | Meggs et al. | |
| 4,686,424 A | 8/1987 | Nuckolls et al. | |
| 4,802,065 A | 1/1989 | Minter et al. | |
| 5,130,909 A | 7/1992 | Gross | |
| 5,145,247 A | 9/1992 | Mandy | |
| 5,211,469 A | 5/1993 | Matthias et al. | |
| 5,237,490 A | 8/1993 | Ferng | |
| 5,264,997 A | 11/1993 | Hutchisson et al. | |
| 5,336,977 A | 8/1994 | Li | |
| 5,713,655 A * | 2/1998 | Blackman | 362/95 |
| 5,833,350 A | 11/1998 | Moreland | |
| 5,842,779 A | 12/1998 | Siebert | |
| 5,851,061 A | 12/1998 | Hegarty | |
| 5,859,499 A | 1/1999 | McAfee | |
| 5,927,845 A | 7/1999 | Gustafson et al. | |
| 6,000,807 A * | 12/1999 | Moreland | 362/95 |
| 6,010,228 A * | 1/2000 | Blackman et al. | 362/95 |
| 6,013,985 A | 1/2000 | Green et al. | |
| 6,107,744 A | 8/2000 | Bavaro et al. | |
| 6,648,496 B1 * | 11/2003 | Elghoroury et al. | 362/555 |
| 6,933,678 B2 | 8/2005 | Kuo | |
| 6,986,589 B2 | 1/2006 | Evans et al. | |
| 7,029,144 B2 | 4/2006 | Fu | |
| 7,052,170 B2 | 5/2006 | Striebel | |
| 7,114,840 B2 | 10/2006 | Hamrick | |
| 7,374,327 B2 | 5/2008 | Schexnaider | |
| 7,614,769 B2 | 11/2009 | Sell | |
| 7,645,047 B2 | 1/2010 | Martinez | |
| 2004/0218379 A1 * | 11/2004 | Barton | 362/95 |
| 2006/0221606 A1 | 10/2006 | Dowling | |
| 2007/0153494 A1 * | 7/2007 | Huang | 362/20 |
| 2008/0073117 A1 * | 3/2008 | Misener | 174/535 |

(Continued)

*Primary Examiner* — Laura Tso

(74) *Attorney, Agent, or Firm* — The Thompson Law Office, P.C.; Lawrence E. Thompson, Esq.

(57) ABSTRACT

Disclosed herein is a lighting system that may include a faceplate, a lighting component, a common electrical component, a battery, means for sensing that normal power is not available, means for triggering a connection between the battery and the light emitting device, means for displaying whether the battery is charged, and a means for triggering a test of the light emitting device and the battery. The faceplate may be sized to cover a single gang electrical box and may include a means to mount approximately flush to the electrical box. The lighting component may be permanently affixed to the faceplate and may include a light emitting device in a first portion of the faceplate such that when illuminated light may emit away from the electrical box.

15 Claims, 3 Drawing Sheets

(56) References Cited

U.S. PATENT DOCUMENTS

2008/0239701 A1* 10/2008 Wu ............................... 362/95
2008/0285271 A1 11/2008 Roberge et al.
2009/0190335 A1 7/2009 Wong
2009/0244880 A1 10/2009 Rapeanu et al.
2010/0141153 A1 6/2010 Recker et al.

* cited by examiner

LIGHTING SYSTEM

BACKGROUND

1. Field

This invention is generally related to lighting systems, and more particularly to an emergency lighting system.

2. Background

During a power failure and/or an emergency situation, it may be necessary to provide some form of backup lighting system and/or some form of egress lighting guide. It is not uncommon for residential and commercial structures to have backup lighting systems, such as portable and fixed battery powered lights and fixed lights powered by batteries and/or redundant power systems. However, portable systems, such as flashlights, may not be readily available or operable, for example due to a battery failure, at the time of the emergency. Fixed lighting systems may fail to provide effective egress lighting as they may be to too scarce, or located at such a distance or location that the user may not be able to perceive or follow any light provided by such systems. Existing structures and building designs already incorporate common and standard sized electrical boxes for housing devices such as electrical receptacles at locations within the structures, including on egress passageways. However, emergency lighting systems are generally provided at other locations, and if associated with common electrical boxes, existing systems tend to eliminate the non-emergency function of the junction box, or provide emergency services inefficiently or at too high a cost.

Other attempts to provide emergency or secondary lighting include: U.S. Patent Publication No. 2009/0244880 entitled "Concealed Emergency Lighting Equipment with Complete Retrofit Housing and Method of Installation," filed by Rapeanu, et al., published on Oct. 1, 2009; U.S. Patent Publication No. 2009/0190335 entitled "Compact Emergency Lighting System," filed by Wong, published on Jul. 30, 2009; U.S. Patent Publication No. 2008/0073117 entitled "Configurable Safety Light Receptacle," filed by Misener, published on Mar. 27, 2008; U.S. Pat. No. 7,645,047 entitled "Deployable Emergency Lighting System," filed by Martinez, issued on Jan. 12, 2010; U.S. Pat. No. 6,986,589 entitled "Apparatus and Methods for Providing an Emergency Lighting Augmentation System," filed by Evans, et al., issued on Jan. 17, 2006 (all of which are incorporated herein by reference). However, these attempts fail to provide a convenient and inexpensive retrofit device for providing emergency lighting using existing standard electrical housings, such as single gang housings, and with components suitable for emergency power operation.

Therefore, there is a need for a lighting system that efficiently and automatically provides illumination during an emergency situation, such as a power failure, and that may provide illumination guidance, and that can be conveniently incorporated into existing residential and commercial structures and design standards.

SUMMARY

Disclosed herein is a new and improved system for emergency lighting. In accordance with one aspect of the approach, the lighting system may include a faceplate, a lighting component, a common electrical component, a battery, means for sensing that normal power is not available, means for triggering a connection between the battery and the light emitting device, means for displaying whether the battery is charged, and a means for triggering a test of the light emitting device and the battery. The faceplate may be sized to cover a single gang electrical box and may include a means to mount approximately flush to the electrical box. The faceplate may also have a plurality of voids for securing the faceplate to the electrical box. The lighting component may be permanently affixed to the faceplate and may include a light emitting device in a first portion of the faceplate such that when illuminated light may emit away from the electrical box. The common electrical component may be mounted in a second portion of the faceplate. The battery may be connected to the light emitting device in order to provide power to the light emitting device when normal power supply is unavailable and may be configured to receive and store power from the normal power supply.

Other systems, methods, aspects, features, embodiments and advantages of the system for emergency lighting disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration.

Furthermore, the components in the figures are not necessarily to scale, emphasis instead being placed upon illustrating the principles of the system disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
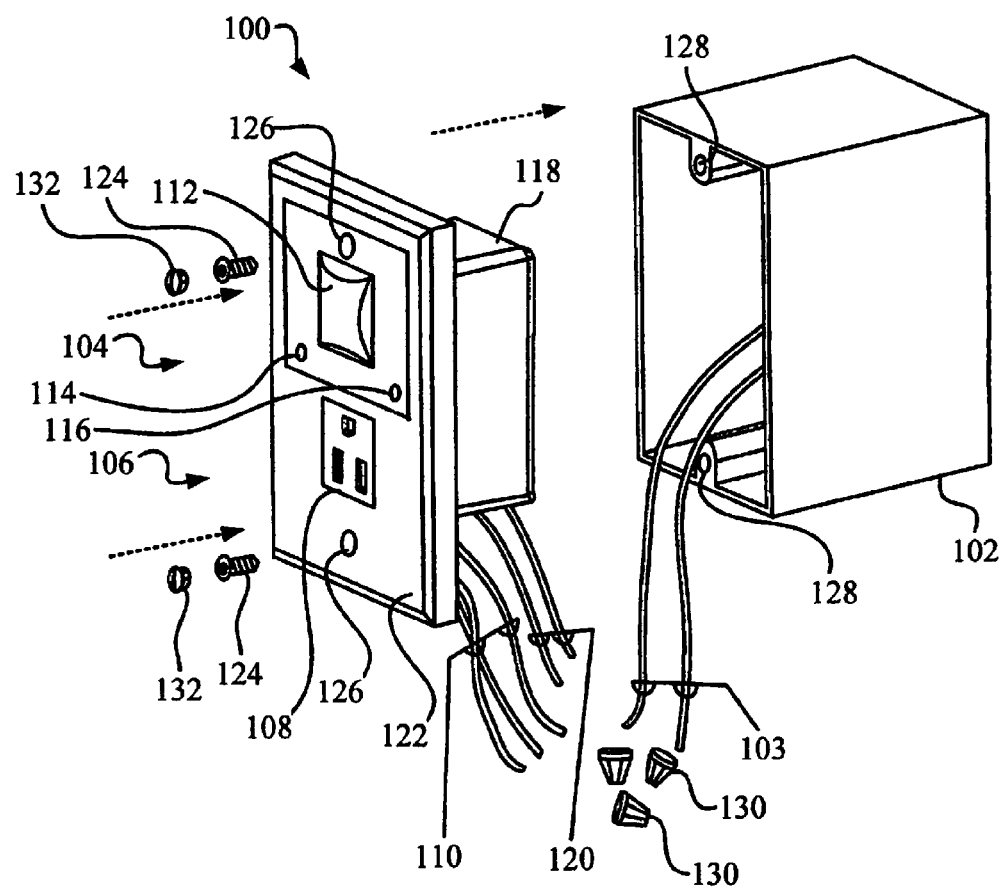
FIG. 1 is a perspective view of one embodiment of the lighting system, including a lighting component and an electrical box.

FIG. 1 shows an emergency protection fixture 100 and an electrical box 102. Electrical box 102 may allow for power to be connected to the emergency protection fixture 100 via power wiring 103. Emergency protection fixture 100 may include a lighting component 104 and a common electrical component 106. Electrical box 102 may be, for example but not limited to, a single gang box with dimensions of approximately 4.25 inches in height, 2.75 inches in width, and 2.75 inches in depth. As is known to those having skill in the art, electrical box 102 may be secured to a component of a residential or commercial structure (not shown), such as a stud in a wall, in a variety of manners. Electrical component 106 may include a number of common electrical devices known to those skilled in the art, such as but not limited to, an outlet 108, a switch 108a (see FIG. 4), and a sensor (not shown), 1, 2, 3 and 4 way switches (not shown), a dimmer (not shown), a photocell (not shown), a motion sensor (not shown), a Passive Infra Red (PIR) device (not shown), and/or an audible alarm.

Figure 4:
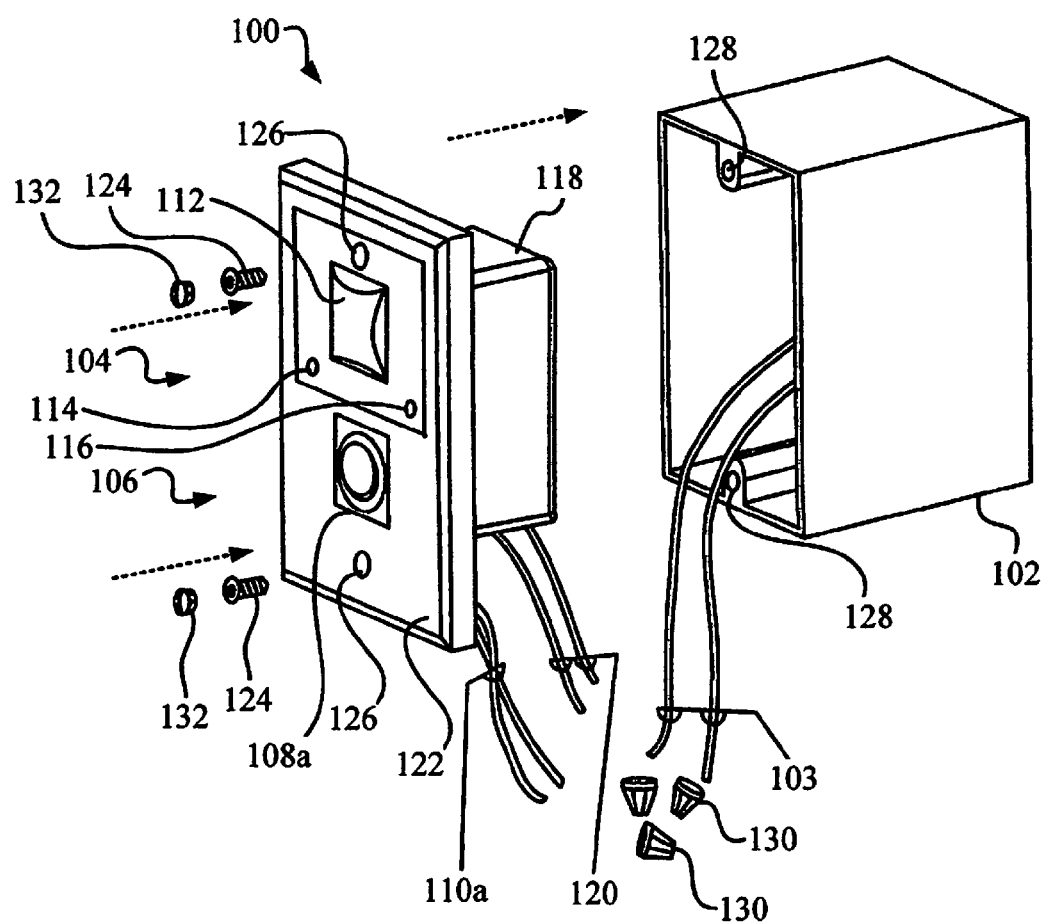
FIG. 4 is a perspective view of another embodiment of the lighting system.

Electrical component 106 may also include electrical component wiring 110 associated with such common electrical devices (see FIG. 4 for electrical components wiring 110a that may be commonly associated with switch 108a).

Lighting component 104 may include a lamp 112, a charge indicator 114, a test initiator 116, a housing 118, and light system wiring 120. Lamp 112 may be but is not limited to a Light Emitting Diode (LED), an incandescent bulb, a strobe, an adjustable aiming lens, and may be accompanied by various colored lens. Power wiring 103, electrical component wiring 110, and light system wiring 120 may be connected in a number of manners known to those having skill in the art, such as but not limited to, using one or more wire nuts 130.

Lighting component 104 and the common electrical component 106 may be mounted and/or incorporated into a faceplate 122 that is designed to be secured to electrical box 102. Faceplate 122 may be secured to electrical box 102 in a number of manners, such as but not limited to, using one or more self-threading screws 124 that partially pass through one or more faceplate voids 126 in order to engage electrical box 102 at locations surrounding one or more electrical box voids 128. A plurality of screw covers 132 may be used to conceal self-threading screws 124.

Figure 2:
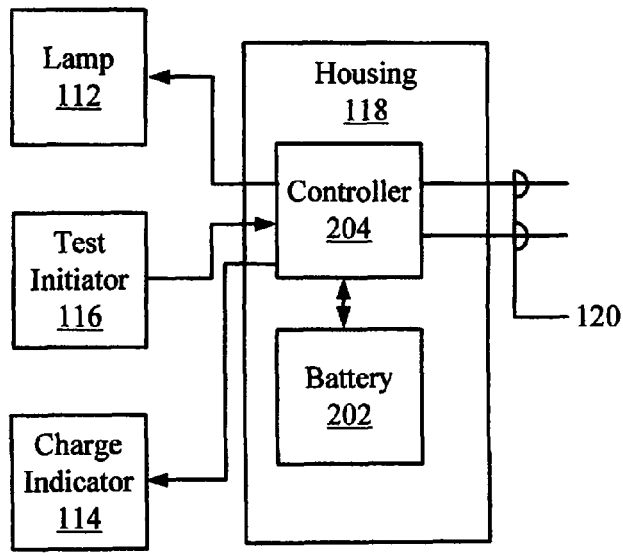
FIG. 2 shows a first block diagram of the lighting component of FIG. 1, including a controller.

FIG. 2 shows a first block diagram of lighting component 104 of FIG. 1. As shown in FIG. 2, lighting component 104 may include a battery 202 and a controller 204 enclosed within housing 118. Battery 202 may be a number of batteries suitable to the application and lamp 112. Such batteries are known to those having skill in the art, such as but not limited to, a 3.7 volt 650 mAH lithium polymer battery pack. Controller 204 may provide circuitry and/or electrical components to control the operation of lamp 112 and associated devices, such as charge indicator 114 and test initiator 116.

Figure 3:
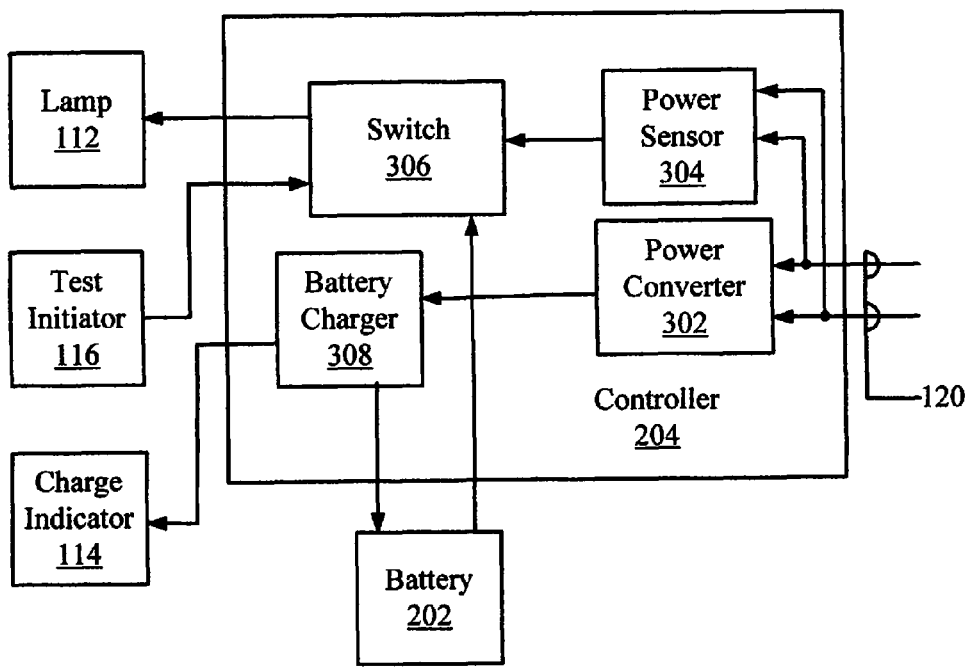
FIG. 3 shows a second block diagram of the lighting component of FIG. 1, including a more detailed block diagram of the controller of FIG. 2.

FIG. 3 shows a second block diagram of the lighting component 104 including a more detailed block diagram of controller 204. As shown in FIG. 3, controller 204 may include a power converter 302, a power sensor 304, a switch 306, and a battery charger 308. Power converter 302 may include various components known to those skilled in the art in order to convert a power supply received on light system wiring 120 into the most suitable form for operating lighting component 104. Power converter 302 may include components such as but not limited to transformers, diodes, rectifiers, capacitors, and filters. Power sensor 304 may include electrical components required to determine that power has been lost or degraded on light system wiring 120, and thus also lost on power system wiring 103, in order to provide a trigger to switch 306. In some embodiments, power sensor 304 may also trigger a reaction by the common electrical component 106, such as, for example, where the common electrical component is an audible alarm.

Switch 306 may provide a connection from battery 202 to lamp 112 when power has been lost or degraded on light system wiring 120. In some embodiments, switch 306 may also be triggered by the common electrical component 106, for example, where the common electrical component may be the photocell, the motion sensor, and/or the PIR device. Battery charger 308 may convert the output (shown) of power converter 302, or directly convert power (not shown) provided on light system wiring 120, in order to provide the most suitable power source for charging and maintaining battery 202 when power is provided to lighting component 104 from power system wiring 103 via light system wiring 120.

In one manor of operation, when power is available on power system wiring 103, battery 202 is charged. Once battery 202 is charged, power may be disconnected from the charging components of battery charger 308. If battery 202 loses its charge, or its charge is reduced through leakage or use, battery charger 308 may reconnect in order to increase to a higher charge level. If power sensor 304 determines there has been a loss of power on light system wiring 120, and thus, on power system wiring 103, power sensor may trigger switch 306 to connect lamp 112 to battery 202. Test initiator 116 may be used to manually trigger switch 306 in order to confirm battery 202 is charged, and that lamp 112 is operational. Charge indicator 114 may be used to provide a visual signal on faceplate 122 that battery 202 is charged.

In one exemplary embodiment, the lighting system includes a faceplate, such as faceplate 122, sized to cover a single gang electrical box, such as electrical box 102, the faceplate having a means to mount approximately flush to the electrical box, as illustrated in FIG. 1 and FIG. 4, and having a plurality of voids, such as faceplate voids 126, for securing to the electrical box, the voids being horizontally centered and spaced approximately 2.25 inches apart. The exemplary embodiment further includes a lighting component, such as lighting component 104, permanently affixed to the faceplate, the lighting component including a light emitting device, such as lamp 112, in a first portion of the faceplate such that when illuminated light may emit away from the electrical box. The exemplary embodiment further includes a common electrical component, such as common electrical component 106, the common electrical component being flush mounted in a second portion of the faceplate. The exemplary embodiment further includes a battery, such as battery 202, the battery connected to the light emitting device in order to provide power to the light emitting device when normal power supply is unavailable, such as when normal power is not provided on light system wiring 120, the battery also being configured to receive and store power from the normal power supply. The exemplary embodiment further includes a means for sensing the unavailability of the normal power supply, such as power sensor 304, and a means for triggering a connection between the battery and the lighting emitting device upon the unavailability of the normal power supply, such as switch 306. The exemplary embodiment further includes a means for displaying on the faceplate whether the battery is charged, such as charge indicator 114, and a means on the faceplate for triggering a test of the light emitting device and the battery, such as test initiator 116.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors or DSPs, one or more microprocessors in conjunction with a DSP core, or any other such configuration.

The blocks of the methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

If implemented in software, the methods, blocks, algorithms, and functions described herein may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A lighting system for mounting in a single gang electrical box having a normal power supply, the system comprising:
   A faceplate sized to cover the electrical box, the faceplate having a means to mount approximately flush to the electrical box and having a plurality of voids for securing to the electrical box, the voids being horizontally centered and spaced approximately 2.25 inches apart;
   a lighting component permanently affixed to the faceplate, the lighting component including a light emitting device in a first portion of the faceplate such that when illuminated light may emit away from the electrical box;
   a common electrical component, the common electrical component being mounted in a second portion of the faceplate;
   a battery, the battery connected to the light emitting device in order to provide power to the light emitting device when the normal power supply is unavailable, the battery also being configured to receive and store power from the normal power supply;
   a means for sensing the unavailability of the normal power supply and a means for triggering a connection between the battery and the lighting emitting device upon the unavailability of the normal power supply;
   a means for displaying on the faceplate whether the battery is charged; and
   a means on the faceplate for triggering a test of the light emitting device and the battery.

2. The system of claim 1, wherein the faceplate is sized to cover the electrical box and the electrical box is approximately 4.25 inches in height and 2.75 inches in width.

3. The system of claim 1, wherein the means to mount approximately flush includes a faceplate that is approximately ⅜ inches in depth.

4. The system of claim 1, wherein the voids for securing to the electrical box are formed of threaded passageways.

5. The system of claim 1, wherein the light emitting device is a light emitting diode.

6. The system of claim 1, further including a lens covering the light emitting device.

7. The system of claim 1, wherein the common electrical device is an outlet.

8. The system of claim 1, wherein the common electrical device is a switch.

9. The system of claim 1, wherein the common electrical device is an audible alarm.

10. The system of claim 1, wherein the common electrical device is a photo cell.

11. The system of claim 1, wherein the common electrical device is a motion sensor.

12. The system of claim 11, wherein the motion sensor triggers the connection between the battery and the lighting emitting device.

13. The system of claim 11, wherein the means for sensing includes software.

14. The system of claim 11, wherein the means for sensing includes a processor.

15. The system of claim 1, wherein the light emitting component includes a lens that is affixed to the faceplate such that other lightning components are inaccessible from the exterior of the faceplate.

\* \* \* \* \*